Feb. 10, 1959 W. KOBER 2,873,395
DYNAMOELECTRIC MACHINE
Filed April 23, 1954 2 Sheets-Sheet 1

INVENTOR.
WILLIAM KOBER
BY
Beau, Brooks, Buckley & Beau,
ATTORNEYS.

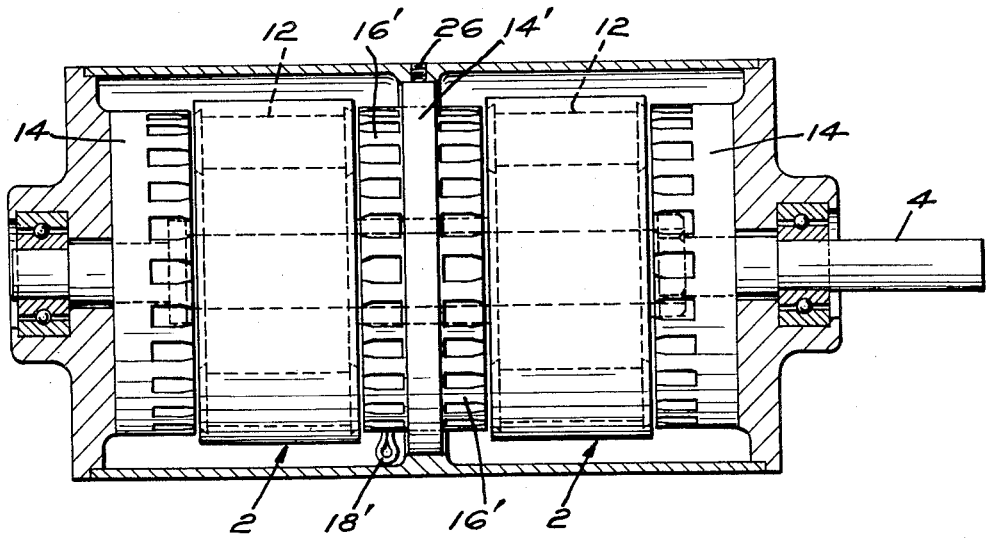

United States Patent Office 2,873,395
Patented Feb. 10, 1959

2,873,395

DYNAMOELECTRIC MACHINE

William Kober, Fairport, N. Y., assignor to
TKM Electric Corp., Rochester, N. Y.

Application April 23, 1954, Serial No. 425,074

2 Claims. (Cl. 310—112)

This invention relates generally to the dynamoelectric machinery art, and more particularly to a new and useful dynamoelectric machine construction utilizing permanent magnets. This application is a continuation-in-part of my pending application Ser. No. 216,185, now Patent No. 2,719,931.

In electric machinery of the type to which this invention relates, when permanent magnets have been used it has been the custom to follow conventional radial air gap electromagnet design, and in effect merely substitute permanent magnets for the usual electromagnets. As pointed out in my said pending application, while this construction is quite advantageous for an electromagnet generator, when used with permanent magnets it is difficult to provide the proper magnet length and protecting structures without disturbing an efficient relation between pole pitch and axial length, and it is necessary to use fastening devices of sufficient strength to hold the magnet and protect the structures and pole pieces against movement radially outwardly by inertial forces.

Accordingly, I disclosed in said pending application a machine of axial air gap design wherein the rotor pole faces lie on a flat surface spaced axially from and facing the flat working surface of the stator, the rotor comprising a block of material of high electrical conductivity and high strength surrounding the magnets for protecting the magnetic state thereof from overload and short circuit armature reaction, and providing the principal mechanical support for the magnets, whereby to enable high speeds of operation. Further advantages of my axial air gap design are set forth in said pending application.

While machines utilizing my axial air gap design as set forth in said pending application develop a surprisingly large capacity, in many instances space limitations are very severe and preclude a machine of a given capacity according to that particular design. There is a definite relation between the magnet and rotor diameter and machine capacity, and while the size or diameter of the machine can be increased, or two separate machines could be utilized, to provide the desired capacity, the aforesaid space limitations and other factors frequently preclude this solution. Such other factors can comprise the necessity of providing critical and indeed virtually impossible bearing structures in such machines of high capacity. For example, a machine of that design producing one kilowatt will have approximately one hundred and fifty pounds end thrust, and such machines having a capacity of thirty kilowatts will have fifteen hundred pounds end thrust. In addition, such large bearing structures result in significant dissipation of power.

Accordingly, it is a primary object of this invention to provide a new dynamoelectric machine construction utilizing permanent magnets incorporating certain basic features of my earlier axial air gap design while departing significantly therefrom through the elimination of a parasitic circuit and the provision of additional working structures, thereby enabling a considerably greater capacity without proportionately increasing the rotor diameter.

It is another object of this invention to provide a machine as aforesaid which provides a saving in weight and in material, and a higher efficiency for a given capacity.

A further object of this invention is to provide a machine as aforesaid having minimum end thrust.

A dynamoelectric machine according to my invention is broadly characterized in the provision of a rotor body carrying magnets extending through the rotor body substantially parallel to the axis of rotor rotation, and stator members axially spaced from the opposite ends of the rotor body and having their working surfaces opposed to the opposite ends of the rotor body.

More specifically, a dynamoelectric machine according to my invention is characterized in the provision of rotating permanent magnet field structures comprising a series of rotor bodies of a material possessing substantial mechanical strength and high electrical conductivity, the rotor bodies carrying permanent magnet members extending therethrough generally lengthwise of the axis of rotation thereof, first armature means interposed between adjacent field structures and providing substantially only an axial path for magnetic flux between adjacent rotor bodies, and second armature means at each end of the series of rotor bodies providing a return path for magnetic flux, said armature means having their working surfaces axially spaced from and facing the adjacent rotor body end faces.

The foregoing and other objects and advantages of a machine according to my invention will become clearly apparent from the ensuing detailed description, taken together with the accompanying drawings wherein like reference numerals denote like parts throughout the various views and wherein:

Fig. 5 is a longitudinal view, partly in section, of another embodiment of a dynamoelectric machine according to my invention.

Figure 1:
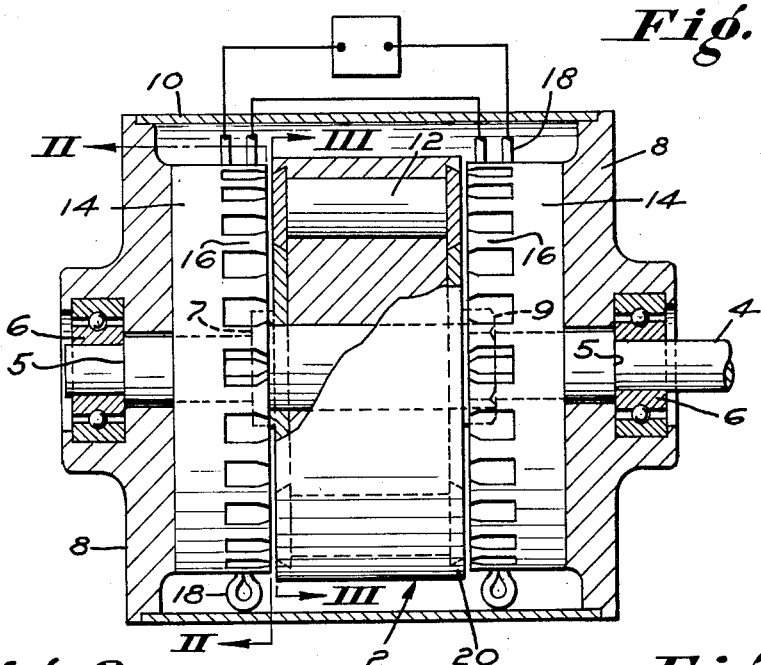
Fig. 1 is a longitudinal view, partly in section and with parts broken away, of one embodiment of a dynamoelectric machine according to my invention.
Figure 2:
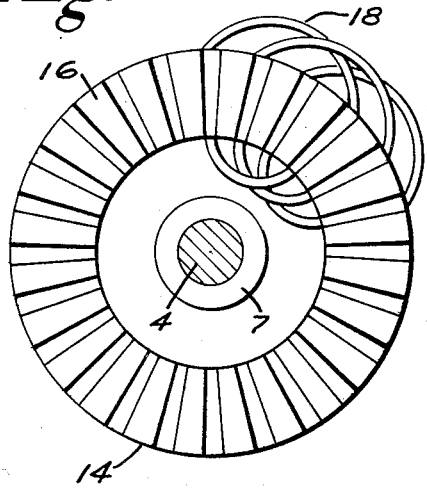
Fig. 2 is an end view of a stator working surface in the machine of Fig. 1, taken about on line II—II of Fig. 1.
Figure 3:
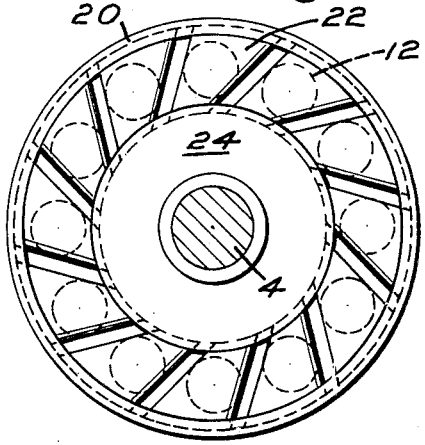
Fig. 3 is an end view of the rotor of Fig. 1, taken about on line III—III of Fig. 1.
Figure 4:
Fig. 4 is a view of a pole piece usable on the rotor of Fig. 1.

Referring now to the embodiment of Figs. 1 through 4, a preferred form of dynamoelectric machine according to my invention has a rotor, generally designated 2 and usually of cylindrical form, rotor 2 comprising in this case a permanent magnet field structure mounted on a shaft 4 journaled for rotation in bearing structures 6 carried by the opposite end plates 8 of the generator casing. The generator casing also includes the cylindrical sleeve 10, the end plates 8 being secured thereto as by threading into the sleeve 10, for example.

Shaft 4 can be shouldered, as at 5, to position the same with respect to bearings 6, and rotor 2 can bear at one end against a shoulder 7 on shaft 4, a nut 9 threaded on shaft 4 bearing against the other end of rotor 2 whereby rotor 2 is positioned in the generator casing.

Rotor 2 comprises a body member of material possessing the characteristics of both high electrical conductivity and a high degree of mechanical strength, such material comprising, for example, wrought duralumin as disclosed in my aforesaid pending application, and the rotor body member is broached or drilled to provide holes for receiving the permanent magnets 12 in substantial parallelism with shaft 4. The magnets 12 are preferably shrunk fit into the rotor block, whereby the rotor body encloses the magnets throughout their length and provides a path of high electrical conductivity encircling the magnets while mechanically supporting the magnets in a manner enabling extremely high speeds of rotation. The advantages of this construction are fully set forth in paid pending application.

However, whereas in my earlier design there is provided a pole piece structure at one end of the rotor body and a stator having its working surface axially spaced from the rotor pole piece structure, with a magnetic plate facing against and providing a return circuit at the ends of the magnets opposite from the pole piece structure; in accord with the instant invention such parasitic return circuits are completely eliminated and additional working structures are provided.

To this end, a pole piece structure and a cooperating stator surface are provided at each end of the rotor body. Thus, referring now to Figs. 1 through 4 which illustrate what might be called a "double-ended" machine, I provide two separate stator armature structures 14, spaced from and facing the opposite ends of rotor 2, each stator being provided with teeth 16 having a winding 18 in the slots between the teeth, and being formed to provide a flat working surface facing the adjacent rotor end. Stators 14 are of conventional form and are carried by end plates 8, being secured thereto in any desired manner as by screws.

Pole piece structures are provided at each end of the rotor body and can comprise in each instance an annular lip 20 formed integrally with the rotor body adjacent the periphery thereof and undercut to receive thereunder the pole pieces 22 which have outwardly converging outer and inner edges. The pole pieces 22 are positioned over the opposite end faces of magnets 12, and then held thereagainst as by a retainer plate 24 having an undercut outer edge overlying the inner edges of the pole pieces 22. This pole piece arrangement is disclosed more fully in my pending application Ser. No. 421,935, filed April 8, 1954, for Rotors for Axial Air Gap Dynamoelectric Machines, and with this arrangement, the pole pieces are ruggedly supported against centrifugal forces produced by high speeds of rotation.

The stator windings 18 are shown connected in series, although in some instances parallel windings would be used.

Thus, while retaining the basic features of my earlier axial air gap design, without unduly complicating the design thereof and without increasing the diameter thereof, a construction in accord with the present invention provides a considerably greater capacity, this being accomplished by the provision of additional working surfaces.

Certain other advantages are obtained in a machine constructed in accord with this invention. For example, pararsitic magnetic return circuits are eliminated, and the magnetic flux is returned across an air gap and through a stator structure, whereby instead of a nonproductive magnetic flux return circuit, this flux is put to work by being returned through a highly productive working structure. This results in greater efficiency and less weight and in a saving in material, per unit output. In addition, end thrust is reduced to a minimum, whereby the aforesaid critical bearing problems are avoided. It will be appreciated that the end thrust forces at the opposite ends of the machine cancel out, or virtually so, whereby any resultant end thrust is very small. It is noted that this is true even if the rotor is displaced along its axis, because the flux across the air gaps remains substantially constant even though the mmf and leakage will vary with variation in the air gap.

Fig. 5 shows a multiple ended machine in accord with the instant invention, this machine having a plurality of rotor bodies, each having a pole piece structure at the opposite ends thereof, with a stator structure working surface arranged in spaced relation with each pole piece structure.

Thus, there can be provided, for example, two separate rotor members 2, each having a pole piece structure at each end thereof, the rotor members 2 being carried in axial alignment by the shaft 4. The stator members 14 are arranged at the remote ends of the rotor members 2, and a center stator member 14' is positioned between the adjacent end faces of the rotor members 2, as by a set screw 26. The center stator member 14' has teeth 16' on each side thereof, with a winding 18' in the spaces between the teeth, and can comprise a unitary member having a pair of oppositely directed working surfaces with no more material therebetween than is required for mechanical strength. The magnetic flux passes through stator member 14', whereby a flux return path through member 14' is not required.

The advantages of a construction in accord with this invention are particularly evident in this embodiment. A machine of considerably greater capacity is provided without an increase in diameter and, as compared for example with using a number of machines of my earlier axial air gap design to achieve the same output, parasitic flux return circuits are completely eliminated and all return circuits are eliminated excepting the two at the opposite ends of the machine, resulting in a proportionate saving in weight and material and a higher efficiency. Also, end thrust is no problem for the reasons previously given.

If desired, still more rotor members can be provided in a construction according to this invention, such additional rotor members having therebetween center stator members 14'.

Therefore, my invention fully accomplishes its aforesaid objects. While two embodiments of my invention are disclosed in detail herein, the invention is not necessarily limited to such details and is to be defined by the appended claims.

Having fully disclosed my invention in certain preferred embodiments thereof, and completely described its mode of operation, what I claim as new is:

1. An axial air gap generator comprising a series of field structures comprising rotor bodies mounted in axially spaced apart relation for rotation about a common axis, each of said rotor bodies having a magnet carrying portion of highly electrically conductive material possessing substantial mechanical strength, permanent magnet members extending through said magnet carrying body portions generally lengthwise of said axis, said body portions completely surrounding said magnet members for substantially the full length thereof and thereby providing a strong mechanical support for said magnet members along the length thereof against centrifugal force while simultaneously encircling said magnet members with a highly electrically conductive path for protecting the magnetic state thereof from overload and short circuit armature reaction, first armature means interposed between adjacent of said rotor bodies and having working surfaces axially spaced from and facing the adjacent end faces of said adjacent rotor bodies, second armature means adjacent the opposite ends of said series of rotor bodies and having working surfaces axially spaced from and facing the opposite end faces thereof, and pole piece structures at the ends of said magnet members at each end face of said rotor bodies for transferring magnetic flux between the ends of said magnet members and the adjacent armature working surfaces, said first armature means providing substantially only an axial path between adjacent of said rotor bodies for magnetic flux, and said second armature means providing a return path for magnetic flux.

2. An axial air gap generator comprising a series of rotor bodies mounted in axially spaced relation for rotation about an axis, each of said rotor bodies having a magnet carrying portion of a highly electrically conductive material having substantial mechanical strength, permanent magnet members extending through said magnet carrying portions generally lengthwise of said axis, said rotor body magnet carrying portions completely surrounding said magnet members for substantially the full length thereof and thereby providing a strong mechanical support for said magnet members along the length thereof against centrifugal force while simultaneously encircling said magnet members with a highly electrically conductive path for protecting the magnetic state thereof from overload and short circuit armature reaction, first stator means interposed between adjacent of said rotor bodies and comprising in each instance means providing substantially only a generally axial through path for magnetic flux between adjacent rotor bodies and having working surfaces on the opposite sides thereof in axially spaced relation to the adjacent rotor body end faces, and second stator means adjacent the opposite ends of said series of rotor bodies having working surfaces facing said opposite ends in axially spaced relation thereto, said second stator means providing a return path for magnetic flux.

References Cited in the file of this patent

UNITED STATES PATENTS

| | | |
|---|---|---|
| 1,359,333 | Cowles | Nov. 16, 1920 |
| 1,566,693 | Pletscher | Dec. 22, 1925 |
| 2,493,102 | Brainard | Jan. 3, 1950 |
| 2,516,901 | Morrill | Aug. 1, 1950 |
| 2,557,249 | Aske | June 19, 1951 |
| 2,626,367 | Beymer | Jan. 20, 1953 |
| 2,734,140 | Parker | Feb. 7, 1956 |

FOREIGN PATENTS

| | | |
|---|---|---|
| 784,532 | France | Apr. 29, 1935 |